Oct. 25, 1949.  C. J. EGGER  2,486,133
FLUID PRESSURE DAMPENING DEVICE
Filed Jan. 24, 1945
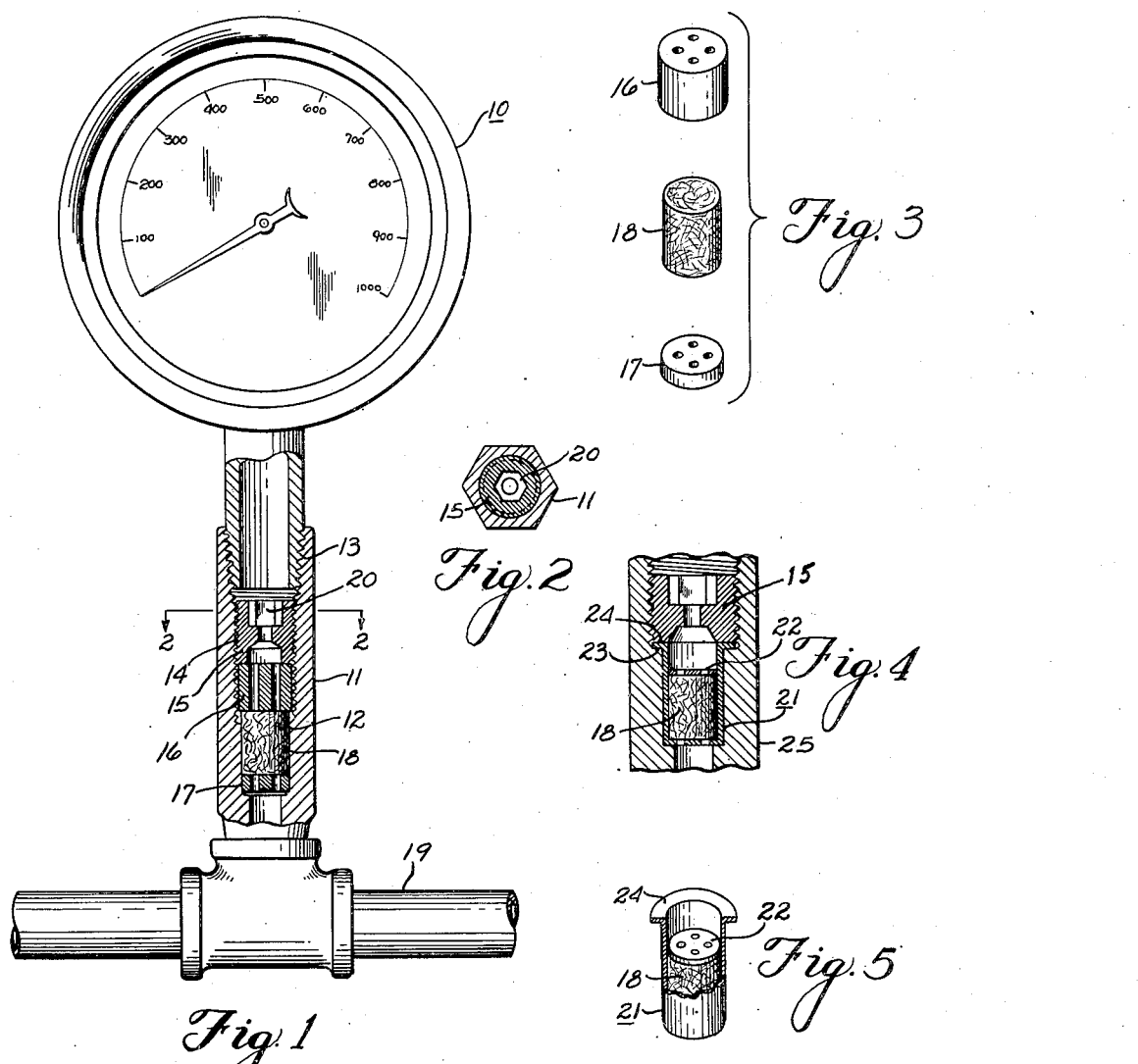
INVENTOR.
Charles J. Egger
BY
Woodling and Krost
Attys Patented Oct. 25, 1949

2,486,133

UNITED STATES PATENT OFFICE 2,486,133

FLUID PRESSURE DAMPENING DEVICE

Charles J. Egger, Cleveland, Ohio, assignor to The Buckeye Laboratories Corporation, a corporation of Ohio Application January 24, 1945, Serial No. 574,426

1 Claim. (Cl. 138—41)

My invention relates in general to pressure fluctuating dampeners, and more particularly to a protecting and dampening device to control the flow of fluid to a pressure indicating instrument to protect the instrument and reduce the fluctuations therein.

Pressure gages, and other pressure recording instruments, when used in connection with liquid or gaseous fluid systems, will be readily effected by such pressure changes and shocks in the system which cause the instrument to fluctuate so rapidly that an accurate reading is impossible, or in some cases, cause such damage to the working parts of the gage as to render it inoperative. Many prior art attempts have been made to eliminate pressure shocks in gages, and although some have met with a degree of success, none have been free from fault. Two prevailing schools of thought seem to dominate in these prior art devices. One is to provide a small orifice, or a series of small orifices, which limit the amount of fluid that is able to pass in a given period of time. The second method, is the provision of porous materials which have many small capillary openings, the total of which equals the area of the small orifices provided in the first method. It is obvious, that the second method, in which a plurality of small openings is provided, is superior to the first method of a single opening, because a single particle is not able to completely clog the system and render the reading of the gage entirely inaccurate. However, the trend has been to provide a porous obstruction of solid material in the second method which is not adjustable after the device has been manufactured. Further, the pores of the porous obstruction are not controlled to a close tolerance. It is therefore seen that every piece manufactured must be tested to be certain that the pores of the obstruction device are interconnected and of sufficient number to render the piece operative. Further, obstructions with very small capillary openings are not satisfactory for relatively low pressure systems, whereas obstructions with relatively large capillary openings are not satisfactory for high pressure systems. These obstructions are not adjustable to meet the various requirements in the field, and therefore separate pieces must be manufactured with various degrees of porosity for various viscosities and characteristics of fluids in the systems.

Therefore, an object of my invention is to provide a pressure peak dampening device which is composed of fibers and may be compressed to any desired degree of packing tightness to control the total free area of passage therethrough.

Another object of my invention is to provide a pressure peak dampening device of glass wool fiber which will serve both as a filter and a pressure peak dampening device and may be adjusted by compression to vary the space between the fibers and thereby control the total free area of passage therethrough.

Another object of my invention is to provide a pressure peak dampening device composed of fibers in a cartridge unit which are factory compressed to a desired degree to control the free area of passage therethrough.

Other objects and a fuller understanding of my invention may be had by referring to the following specification and claims in connection with the accompanying drawings, in which:

Figure 1 is a side elevational view of a gage and a fluid system conduit connected by a connecting member having my improved pressure peak dampening device mounted therein;

Figure 2 is a cross-sectional view along the lines 2—2 of Figure 1;

Figure 3 is an exploded view of my improved pressure peak dampening device and two end pieces used therewith;

Figure 4 is a fragmentary view of an alternative type of an interconnecting member which may be used to hold a cartridge assembly; and Figure 5 is a perspective view of an assembled cartridge which may be used in the interconnecting member illustrated in Figure 4, in place of individual parts as used within the interconnecting member of Figure 1;

With reference to the drawing, I illustrate a gage 10 and a fluid system pipe 19 with an interconnecting member 11 connected therebetween. Although I have illustrated a conventional gage, it is understood that water or mercury column indicators, or other similar devices might be used.

The interconnecting member 11 is provided with a chamber 12 which serves as a passageway therethrough. In this particular adaptation of the member 11, I illustrate a tapered threaded portion 13 into which the gage 10 may be threaded, and a straight threaded portion 14. An end piece 17 is placed at one end of the chamber 12, my improved pressure peak dampening device—in this case a wad of glass wool 18—is placed in the chamber 12 in contact with the end piece 17, and a second end piece 16 is placed on top thereof. A compression device, in this case a threaded member 15 to fit the straight threaded portion 14, is provided with Allen wrench sockets 20 and is disposed to be tightened against the perforated end piece 16 to place compression upon the wad 18.

In operation, the wad 18 may be pressed by the compression device 15 to any degree desired. Therefore, if the gage is to operate on a high pressure system in which large fluctuations are prevalent, the wad 18 may be compressed to a high degree in order that the area of free passage space therethrough may be reduced to a very small amount. On the other hand, if the gage is to be used with a relatively low pressure system in which large fluctuations are prevalent, the wad 18 need not be compressed to such a great extent. It will readily be understood, that the individual fibers of the wad 18 are spaced from one another along various portions of their length and thereby provide many small pores or passageways through which the fluid must find its way in passing from one side to the other. Thus, it is seen that a long torturous path is provided for the fluid which may be of far greater length than the actual overall dimensions of the wad 18. Further, the small passages provided offer a considerable amount of surface friction to the passage of fluid, and therefore tend to offer an additional retarding action.

My invention provides a unique advantage inasmuch as the size and plurality of the small passageways may be varied by the amount of pressure placed upon the wad 18. Further, this wad 18 also serves as a filter to prevent the passage of any foreign objects of considerable size which may be abrasive and damage a sensitive gage.

An alternative method of providing the pressure peak dampening device is illustrated in the Figures 4 and 5. The Figure 5 illustrates a cartridge 21 which is perforated at the bottom and filled with fibrous glass wool. A flange 24 is provided on the cartridge to contact an internal shoulder 23 of the interconnecting member. After placing the glass wool in the cartridge 21, a cover plate 22 is placed therein and compressed to the desired degree to compress the glass wool fibers together and close the passageways therebetween. The degree of compression which is placed upon the glass wool by the cover plate, is determined by the conditions under which the pressure peak dampening device is to operate. If relatively low pressures are to be encountered, the cover plate is pressed down less than it would be if the device were to be used with a high pressure system. The cover is then secured in place by spot welding or soldering or other suitable means. The Figure 4 illustrates a suitable interconnecting member 25 which may be used to hold this preformed cartridge 21. It will be noted that the general structure is similar, and that an internal shoulder 23 is provided against which the flange 24 of the cartridge 21 may rest. The flange 24 is sealed tightly against the shoulder 23 by tightening the compression device 15 tightly thereagainst. Therefore, very little or no fluid will by-pass the cartridge, but must pass therethrough.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

A pressure peak dampening device to protect a pressure indicating instrument for a fluid system subject to pressure fluctuations, said pressure peak dampening device comprising an interconnecting member adapted for connecting between the said fluid system and the pressure indicating instrument, said interconnecting member having a chamber to provide a passage therethrough, a cartridge containing a fibrous glass wool wad to serve as an obstruction disposed in said chamber, said cartridge comprising a container open at one end and having perforations at another end, fibrous material in said cartridge, a perforated cap closing said open end and placing compressive force on said fibrous glass wool, said cartridge confining said glass wool under a predetermined pressure to control the total free area of passage therethrough for the said fluid.

CHARLES J. EGGER.

REFERENCES CITED

The following references are of record in the file of this patent:

UNITED STATES PATENTS

| Number | Name | Date |
|--------|------|------|
| 805,079 | Koehler | Nov. 21, 1905 |
| 1,140,420 | Thomas | May 25, 1915 |
| 1,144,040 | Keller | June 22, 1915 |
| 1,694,838 | Bayha | Dec. 11, 1928 |
| 1,734,027 | Bijur | Oct. 29, 1929 |
| 1,836,682 | Ray | Dec. 15, 1931 |
| 2,061,949 | Monroe | Nov. 24, 1936 |
| 2,169,359 | Jones et al. | Aug. 15, 1939 |
| 2,210,480 | Brice | Aug. 6, 1940 |
| 2,327,195 | Kosky et al | Aug. 17, 1943 |
| 2,370,965 | Kahn | Mar. 6, 1945 |
| 2,372,408 | Trich | Mar. 27, 1945 |

FOREIGN PATENTS

| Number | Country | Date |
|--------|---------|------|
| 2,314 | Great Britain | Feb. 13, 1890 |